United States Patent
Ferreira et al.

(10) Patent No.: US 9,776,740 B2
(45) Date of Patent: Oct. 3, 2017

(54) AIRCRAFT CAPABLE OF PASSING FROM THE AERIAL DOMAIN TO THE SPATIAL DOMAIN AND METHOD FOR AUTOMATICALLY ADAPTING THE CONFIGURATION OF SAME

(71) Applicant: AIRBUS DEFENCE AND SPACE SAS, Les Mureaux (FR)

(72) Inventors: Eugénio Ferreira, Toulouse (FR); Christophe Chavagnac, Paris (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 151 days.

(21) Appl. No.: 14/899,096

(22) PCT Filed: Jun. 11, 2014

(86) PCT No.: PCT/FR2014/000128
§ 371 (c)(1),
(2) Date: Dec. 16, 2015

(87) PCT Pub. No.: WO2014/202842
PCT Pub. Date: Dec. 24, 2014

(65) Prior Publication Data
US 2016/0347480 A1  Dec. 1, 2016

(30) Foreign Application Priority Data
Jun. 18, 2013 (FR) ...................................... 13 55742

(51) Int. Cl.
*B64G 1/14*  (2006.01)
*B64D 27/02*  (2006.01)
(Continued)

(52) U.S. Cl.
CPC ............. *B64G 1/14* (2013.01); *B64D 27/023* (2013.01); *B64G 1/48* (2013.01); *B64G 1/52* (2013.01);
(Continued)

(58) Field of Classification Search
CPC .............. B64G 1/14; B64D 2013/0681; B64D 2231/00; B64D 2027/026
See application file for complete search history.

(56) References Cited

U.S. PATENT DOCUMENTS

| | | | | |
|---|---|---|---|---|
| 4,651,728 A | * | 3/1987 | Gupta | ...................... A62B 7/14 128/201.28 |
| 6,119,985 A | * | 9/2000 | Clapp | ..................... B64C 39/02 244/135 R |
| 2010/0044494 A1 | | 2/2010 | Teacherson | |

FOREIGN PATENT DOCUMENTS

| | | |
|---|---|---|
| FR | 2 855 061 A1 | 11/2004 |
| WO | 98/39207 A1 | 9/1998 |

OTHER PUBLICATIONS

International Search Report and Written Opinion dated Sep. 11, 2014, issued in corresponding International Application No. PCT/FR2014/000128, filed Jun. 11, 2014, 10 pages.
(Continued)

*Primary Examiner* — Richard G Davis
(74) *Attorney, Agent, or Firm* — Christensen O'Connor Johnson; Matthew Balint; John Denkenberger

(57) ABSTRACT

An aircraft is capable of passing from the aerial domain to the spatial domain and method for automatically adapting the configuration of same. An additional breathable gas supply is provided to be activated only during a flight phase during which aerobic propulsion is interrupted, and is
(Continued)

capable of supplying the control system of the manned cabin environment instead of the system associated with the aerobic propulsion means.

6 Claims, 2 Drawing Sheets

(51) Int. Cl.
    *B64G 1/48*     (2006.01)
    *B64G 1/52*     (2006.01)
    *B64G 1/60*     (2006.01)
    B64D 13/06     (2006.01)

(52) U.S. Cl.
    CPC ........ *B64G 1/60* (2013.01); *B64D 2013/0618* (2013.01); *B64D 2013/0681* (2013.01); *B64D 2027/026* (2013.01); *B64D 2231/00* (2013.01); *B64D 2231/02* (2013.01); *Y02T 50/56* (2013.01)

(56) References Cited

OTHER PUBLICATIONS

Written Opinion of the International Searching Authority dated Sep. 11, 2014, issued in corresponding International Application No. PCT/FR2014/000128, filed Jun. 11, 2014, 7 pages.
International Preliminary Report on Patentability dated Dec. 22, 2015, issued in corresponding International Application No. PCT/FR2014/000128, filed Jun. 11, 2014, 1 page.

* cited by examiner

AIRCRAFT CAPABLE OF PASSING FROM THE AERIAL DOMAIN TO THE SPATIAL DOMAIN AND METHOD FOR AUTOMATICALLY ADAPTING THE CONFIGURATION OF SAME

The present invention relates to an aircraft which is capable of changing over from air travel to space travel, and to a method for automatically adapting the configuration of said aircraft.

Although not exclusively, this invention is particularly suitable for being used in a spaceplane, that is to say an aeroplane which is equipped with both aerobic propulsion means, such as turboshaft engines, and anaerobic propulsion means, such as a rocket engine, and which is capable of taking off from the ground in the usual manner for an aeroplane, of flying at high altitude at a transonic or even supersonic speed, and then of landing also in the usual manner for an aeroplane.

An aircraft is already known which is provided with at least one manned cabin and comprises:
- fixed aerobic propulsion means, such as turboshaft engines, for propulsion during air flight, and anaerobic propulsion means, such as a rocket engine, for propulsion during space flight, said anaerobic propulsion means being steerable so as to make it possible to pilot the aircraft during said space flight;
- aerodynamic surfaces (flaps, control surfaces, etc.) for piloting the aircraft during air flight;
- a system for controlling the environment (pressurisation, temperature, etc.) of the manned cabin, supplied by the aerobic propulsion means;
- a store of breathable survival gas, for example consisting of oxygen cylinders, which store is only capable of temporarily supplying the manned cabin with breathable gas, but without pressurising said cabin, in the event of said system for controlling the environment malfunctioning at high altitude, in order to allow the aircraft to return to a lower altitude which does not require said cabin to be pressurised;
- an electrical power supply system which is actuated by said aerobic propulsion means;
- electrical energy storage means, such as batteries, and
- a system for producing piloting commands.

In the case of an aircraft of this kind, the nominal type of flight operations can include extinguishing the aerobic propulsion means for a significant period of the mission. Of course, the comfort and condition of the passengers in the cabin must remain unchanged, whether or not the aerobic propulsion means are operating.

For this purpose, according to the invention, the aircraft of the type described above comprises an additional store of breathable gas of the high-pressure capacity type, which is activated only during a stage of flight when the aerobic propulsion is interrupted, and which is capable of supplying the system for controlling the environment of said manned cabin by replacing the aerobic propulsion means.

Advantageously, said additional store of breathable gas is of the pressurised gas cylinder type.

Preferably, such a switchover of environment generation is carried out in the context of a process of automatically adapting the configuration of the aircraft when said aircraft passes from air flight to space flight.

According to the present invention, such a method for automatically adapting the configuration of an aircraft, the mission of which makes it change over from air flight to space flight, is characterised on account of carrying out the following operations:
- installing an additional store of breathable gas on-board said aircraft, which store is capable of supplying said system for controlling the environment of said manned cabin;
- determining, prior to said mission, the conditions required at the end of the air flight in order to change over to the space flight, and
- detecting said conditions during the air flight, and, when they are achieved:
- supplying the system for controlling the environment of the cabin by means of the additional supply of breathable gas in place of the aerobic propulsion means,
- verifying that the environment of the cabin resulting from being supplied by the store of breathable gas is correct and then, if this is the case,
- powering the electrical power supply system of the aircraft via the electrical energy storage means in place of the aerobic propulsion means,
- verifying that the electrical power produced by said electrical power supply system powered by said electrical energy storage means is correct and then, if this is the case,
- transmitting piloting commands generated by the system for producing piloting commands to the steerable anaerobic propulsion means in place of the aerodynamic piloting surfaces of the aircraft.

Preferably, in order to supply the system for controlling the environment by means of the additional store of breathable gas, first said store is activated, then said system for controlling the environment is switched from the aerobic propulsion means to said additional store of breathable gas, and the supply from the aerobic propulsion means is deactivated.

An alarm is emitted in the event that the environment of the manned cabin resulting from being supplied by the additional store of breathable gas is not correct.

In the same way, in order to power the electrical power supply system via the electrical energy storage means, first said means are activated, then said electrical power supply system is switched from the aerobic propulsion means to said electrical energy storage means, and the power from the aerobic propulsion means is deactivated, and an alarm is emitted in the event that the electrical power produced by said electrical power supply system powered by said energy storage means is not correct.

When piloting commands generated by said system for producing piloting commands are transmitted to the steerable anaerobic propulsion means, first the process of steering the anaerobic propulsion means is checked, then the transmission of the piloting commands is switched to said means, and the piloting control by said aerodynamic surfaces is deactivated. A check is then made as to whether the piloting by the steerable anaerobic propulsion means is correct, and if not an alarm is emitted.

The figures of the accompanying drawings will give a better understanding of how the invention can be carried out.

In these figures, identical references denote similar elements.

Figure 1:
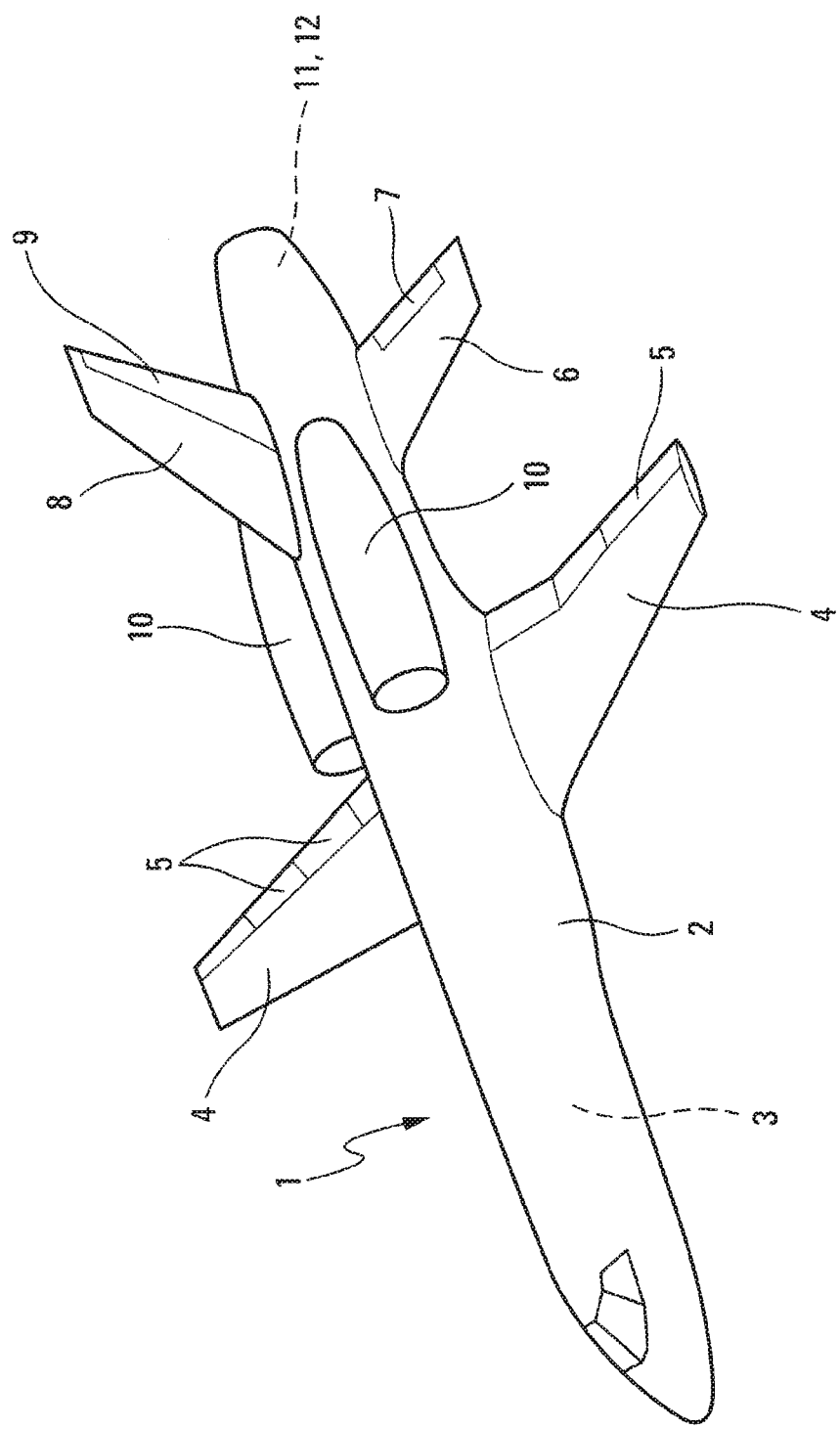
FIG. 1 is a perspective view of a spaceplane to which the invention can be applied.

The single-deck spaceplane 1 shown in FIG. 1 comprises a fuselage 2 which defines at least one manned cabin 3, wings 4 having aerodynamic flaps 5, horizontal tails 6 having aerodynamic flaps 7, and a vertical tail 8 having a rudder 9.

Said spaceplane 1 comprises aerobic propulsion means 10, for example formed by lateral turboshaft engines, and anaerobic propulsion means 11, for example formed by a rocket engine 12 arranged at the rear of the fuselage 2.

Figure 2:
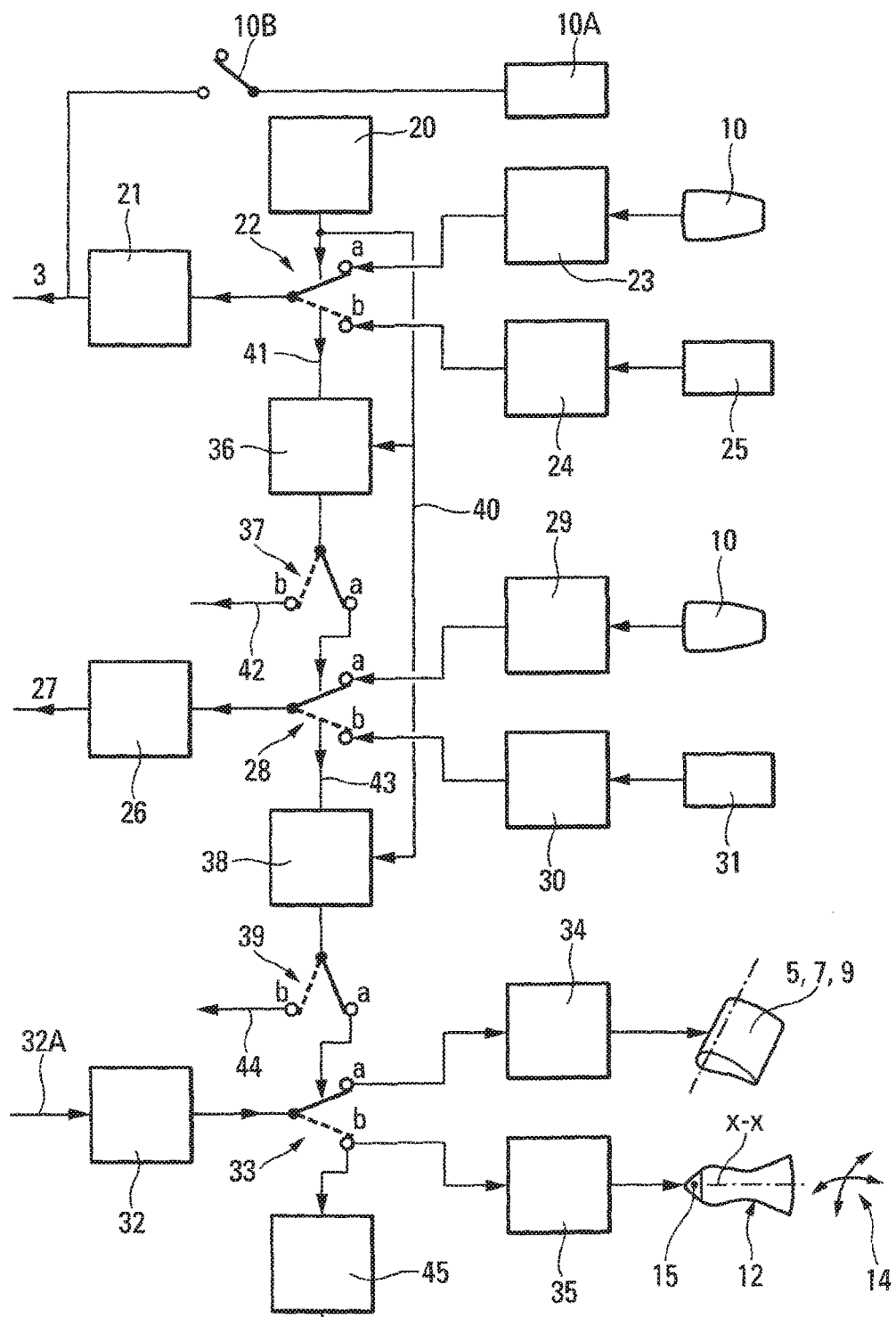
FIG. 2 is a block diagram illustrating the present invention. In this block diagram, the switchovers have been represented by discrete changeover switches for the purpose of understanding, but it goes without saying that, in reality, said changeover switches are electronic or computerised.

As shown by the arrows 14 in FIG. 2, the rocket engine 12 is articulated at 15 so as to be steerable about the axis x-x thereof.

The spaceplane 1 comprises, in addition:
  a detector 20 capable of detecting a change-over point from the air flight phase of said spaceplane 1 to the space flight phase, defined using navigation information thereof, such as kinematic conditions of altitude, speed, outside pressure, etc.;
  a system 21 for controlling the environment inside the cabin 3 of the spaceplane 1, said system 21 being capable of being supplied with air by means of switching means 22, or by means of an air bleed device 23 on the aerobic propulsion means 10, or by means of an air distribution device 24 supplied by an additional store of air 25 formed for example by compressed air cylinders;
  a store of breathable survival gas 10A, which is capable, in the event of said system for controlling the environment 21 malfunctioning at high altitude, of only supplying said manned cabin 3 with breathable gas for the time the aircraft 1 takes to return to a sufficiently low altitude at which the pressurisation and heating of said cabin are no longer required, said store of breathable survival gas 10A being put into operation by a controller 10B;
  an electrical power supply system 26 for the various apparatuses 27 of the spaceplane 1, said system 26 being supplied with power by means of switching means 28, or by means of an electrical generator 29 driven by the aerobic propulsion means 10, or by an electrical power generation device 30 powered by batteries 31, and
  a system 32 for producing piloting commands for the spaceplane 1 from orders which are created by the pilot by operating the control stick and the rudder bar and which are directed to the input 32A of said system 32, the piloting commands of said system 32 being transmitted, by means of switching means 33, either to an air flight control system 34 controlling the flight of the spaceplane 1 by means of aerodynamic flaps and control surfaces 5, 7, 9, or to a space flight control system 35 by steering the rocket engine 12.

Moreover, the spaceplane 1 comprises:
  a device 36, between the switching means 22 and the switching means 28, for verifying the operation of the air distribution device 24 supplied by the store of air 25, said verification device 36 being connected to the switching means 28 by means of switching means 37;
  a device 38, between the switching means 28 and the switching means 33, for verifying the operation of the electrical power generation device 30 powered by the batteries 31, said verification device 38 being connected to the switching means 33 by means of switching means 39; and
  a control line 40 between the detector 20 at one end, and the verification device 36 of the air distribution device 24 and the verification device 38 of the electrical power generation device 30 at the other end.

The system of FIG. 2, according to the present invention, operates in the following manner:

A. As long as the spaceplane 1 is in air flight, below the point of flight which can be detected by the detector 20, the verification device 36 of the air distribution device 24 and the verification device 38 of the electrical power generation device 30 are inactive, and the switching means 22, 28 and 33 are in their positions a represented by the solid line in FIG. 2, such that:
  the system 21 for controlling the environment inside the manned cabin 3 is supplied by the air bleed device 23 on the aerobic propulsion means 10,
  the electrical power supply system 26 is powered by the electrical power generation system 29 driven by the aerobic propulsion means 10, and
  the system 32 for producing piloting commands transmits said commands to the flight control system 34 capable of actuating the aerodynamic flaps and control surfaces 5, 7, 9.

B. When the spaceplane 1 reaches the point of flight to which the detector 20 is sensitive, said detector generates an order which switches the switching means 22 from their position a (the solid line) to their position b (in dashes) such that, now, the additional source 25 is activated, the system 21 for controlling the environment inside the manned cabin 3 is controlled by the air distribution device 24 supplied by said additional store of air 25, and the air supply from the aerobic propulsion means 10 is deactivated.

Furthermore, said command generated by the detector 20 activates the verification devices 36 and 38 via the line 40.

First of all, the verification device 36 verifies, via a link 41, that the operation of the whole of the air distribution device 24 and the additional store of air 25 is correct. If this is not the case, said verification device causes the switching means 37 to take up their position b (in dashes), and generates a warning signal on a line 42 and/or orders a safeguarding procedure.

On the other hand, if the operation of the air distribution device 24 and of the store of air 25 is correct, the verification device 36 causes the switching means 37 to take up their position a (the solid line), which controls the switching of the switching means 28 from their position a (the solid line) to their position b (in dashes), after activation of the batteries 31 and before deactivation of the generator 29. The electrical power supply system 26 of the various apparatuses of the spaceplane 1 is therefore itself powered by the electrical power generation device 30 and the batteries 31.

The verification device 38 verifies, via a link 43, that the operation of the whole of the electrical power generation device 30 and the batteries 31 is correct. If this is not the case, said verification device causes the switching means 39 to take up their position b (in dashes), and generates a warning signal on a line 44 and/or orders a safeguarding procedure.

On the other hand, if the operation of the electrical power generation device 30 and of batteries 31 is correct, the verification device 38 causes the switching means 39 to take up their position a (the solid line), which controls the switching of the switching means 33 from their position a (the solid line) to their position b (in dashes). The system 32 for producing piloting commands 1 thus now transmits said commands to the flight control system 35 by steering the rocket engine 12. A verification device 45 verifies that the piloting of the spaceplane 1 by the rocket engine 12 is correct, and emits an alarm/and or orders a safeguarding procedure if this is not the case.

The invention claimed is:

1. A method for automatically adapting the configuration of an aircraft, the mission of which makes it change over from air flight to space flight,
   said aircraft comprising a single deck provided with at least one manned cabin and further comprising:
   aerobic propulsion means and steerable anaerobic propulsion means,
   aerodynamic piloting surfaces,
   a system configured to control the environment of the cabin, supplied by the aerobic propulsion means,
   a store of breathable survival gas (10A), which store is configured to temporarily supply said manned cabin with breathable gas in the event of said system configured to control the environment of the cabin malfunctioning at high altitude,
   an electrical power supply system which is configured to be actuated by said aerobic propulsion means,
   electrical energy storage means, and
   a system configured to produce piloting commands,
   wherein the method comprises:
   installing an additional store of breathable gas on-board said aircraft, which store is configured to supply said system configured to control the environment of the manned cabin,
   determining, prior to said mission, the conditions required at the end of the air flight in order to change over to the space flight, and
   detecting said conditions during the air flight, and, when they are achieved:
   supplying the system configured to control the environment of the cabin by means of the additional supply of breathable gas in place of the aerobic propulsion means,
   verifying that the environment of the cabin resulting from being supplied by the additional store of breathable gas is correct and then, if this is the case,
   powering the electrical power supply system via the electrical energy storage means in place of the aerobic propulsion means,
   verifying that the electrical power produced by said electrical power supply system powered by said electrical energy storage means is correct and then, if this is the case, and
   transmitting piloting commands generated by said system configured to produce piloting commands to the steerable anaerobic propulsion means in place of said aerodynamic piloting surfaces.

2. A method according to claim 1, wherein, in order to supply the system configured to control the environment by means of the additional store of breathable gas, first said store is activated, then said system configured to control the environment is switched from the aerobic propulsion means to said additional store of breathable gas, and the supply from the aerobic propulsion means is deactivated.

3. A method according to claim 1, wherein at least one alarm is emitted in the event that the environment of the cabin resulting from being supplied by the additional store of breathable gas is not correct.

4. A method according to claim 1, wherein, in order to power the electrical power supply system by means of the electrical energy storage means, first said means are activated, then said electrical power supply system is switched from the aerobic propulsion means to said electrical energy storage means, and the power from the aerobic propulsion means is deactivated.

5. A method according to claim 1, wherein at least one alarm is emitted in the event that the electrical power produced by said electrical power supply system powered by said energy storage means is not correct.

6. A method according to claim 1, wherein, in order to transmit piloting commands generated by said system configured to produce piloting commands to the steerable anaerobic propulsion means, first the process of steering the anaerobic propulsion means is checked, then the transmission of the piloting commands is switched to said means, and the piloting control by said aerodynamic surfaces is deactivated.

* * * * *